United States Patent
Oh et al.

(10) Patent No.: US 9,059,477 B2
(45) Date of Patent: Jun. 16, 2015

(54) SECONDARY BATTERY COMPRISING EUTECTIC MIXTURE AND PREPARATION METHOD THEREOF

(75) Inventors: Jae Seung Oh, Seoul (KR); Shin Jung Choi, Daejeon (KR); Byoung Bae Lee, Daejeon (KR); Jae Duk Park, Daejeon (KR); Ji Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1515 days.

(21) Appl. No.: 11/586,607

(22) Filed: Oct. 26, 2006

(65) Prior Publication Data

US 2007/0099090 A1    May 3, 2007

(30) Foreign Application Priority Data

Oct. 27, 2005    (KR) ........................ 10-2005-0101762

(51) Int. Cl.

| | |
|---|---|
| *H01M 10/0525* | (2010.01) |
| *H01M 10/0565* | (2010.01) |
| *H01M 10/0566* | (2010.01) |
| *H01M 10/42* | (2006.01) |
| *H01M 4/131* | (2010.01) |
| *H01M 4/1391* | (2010.01) |
| *H01M 4/525* | (2010.01) |

(52) U.S. Cl.
CPC .......... *H01M 10/0525* (2013.01); *H01M 4/131* (2013.01); *H01M 4/1391* (2013.01); *H01M 4/525* (2013.01); *H01M 10/0565* (2013.01); *H01M 10/0566* (2013.01); *H01M 10/4235* (2013.01); *Y02E 60/122* (2013.01)

(58) Field of Classification Search
CPC ..................... H01M 10/0525; H01M 10/0565; H01M 10/0566; H01M 10/4235; H01M 4/131; H01M 4/1391; H01M 4/525
See application file for complete search history.

(56) References Cited

U.S. PATENT DOCUMENTS

| | | |
|---|---|---|
| 3,899,353 A | 8/1975 | Tomita |
| 4,060,667 A | 11/1977 | Askew et al. |
| 4,833,046 A | 5/1989 | Roy |

(Continued)

FOREIGN PATENT DOCUMENTS

| | | |
|---|---|---|
| EP | 1 862 452 A1 | 12/2007 |
| JP | 07-272723 | 10/1995 |

(Continued)

OTHER PUBLICATIONS

Mizoguchi Isao, "State-of-tie-art secondary battery", Business & Technology Daily News, Nov. 10, 1995, p. 264.

*Primary Examiner* — Helen O Conley
(74) *Attorney, Agent, or Firm* — McKenna Long & Aldridge LLP

(57) ABSTRACT

A secondary battery comprising a cathode, an anode, a separator and an electrolyte that comprises a eutectic mixture formed of: an amide group-containing compound, and an ionizable lithium salt. The anode comprises a metal or metal oxide having a potential vs. lithium potential (Li/Li$^+$) within electrochemical window of the eutectic mixture. Because the secondary battery uses a eutectic mixture as an electrolyte in combination with an anode having a potential vs. lithium potential (Li/Li$^+$) within the electrochemical window of the eutectic mixture, problems such as decomposition of an electrolyte and degradation of the quality of a battery are avoided. Also, due to the thermal and chemical stability, high conductivity and a broad electrochemical window of a eutectic mixture, it is possible to improve the quality as well as safety of a battery.

9 Claims, 2 Drawing Sheets

(56) References Cited

U.S. PATENT DOCUMENTS

| | | | |
|---|---|---|---|
| 4,965,146 A | | 10/1990 | McCullough et al. |
| 5,478,673 A | * | 12/1995 | Funatsu ............... 429/331 |
| 5,827,602 A | * | 10/1998 | Koch et al. ............ 429/328 |
| 5,895,730 A | | 4/1999 | Ritchie |
| 6,051,343 A | * | 4/2000 | Suzuki et al. .......... 429/316 |
| 6,120,696 A | | 9/2000 | Armand et al. |
| 6,797,436 B2 | | 9/2004 | Takizawa et al. |
| 2002/0026021 A1 | * | 2/2002 | Armand et al. ........ 526/240 |
| 2003/0165737 A1 | | 9/2003 | Nakagawa et al. |

FOREIGN PATENT DOCUMENTS

| | | |
|---|---|---|
| JP | 07-335255 A | 12/1995 |
| JP | 08-311138 A | 11/1996 |
| JP | 09-073907 A | 3/1997 |
| JP | 10-064584 A | 3/1998 |
| JP | 10-265674 | 10/1998 |
| JP | 11-067265 | 3/1999 |
| JP | 11-067265 A | 3/1999 |
| JP | 2002-063942 A | 2/2002 |
| JP | 2000-110225 | 4/2002 |
| JP | 2002-110225 | 4/2002 |
| JP | 2004-273168 A | 9/2004 |
| JP | 2005-142024 A | 6/2005 |
| JP | 2005-174798 A | 6/2005 |
| KR | 1020060051332 A | 5/2006 |
| KR | 1020070021962 A | 2/2007 |
| TW | 527745 | 4/2003 |
| WO | WO 2007/049871 A1 | 5/2007 |

* cited by examiner (1) Cathode, (2) Anode, (3) Separator and Electrolyte, (4) Spacer (5) Coin can casing, (6) Coin can lid, (7) Rubber sealant

SECONDARY BATTERY COMPRISING EUTECTIC MIXTURE AND PREPARATION METHOD THEREOF

This application claims the benefit of the filing date of Korean Patent Application No. 2005-101762, filed on Oct. 27, 2005, in the Korean Intellectual Property Office, the disclosure of which is incorporated herein in its entirety by reference.

TECHNICAL FIELD

The present invention relates to a eutectic mixture-containing electrolyte having high thermal and chemical stability, high electric conductivity and a broad electrochemical window. Also, the present invention relates to an electrochemical device having improved safety and quality by using the same electrolyte.

BACKGROUND ART

Recently, interests in energy storage technology have been gradually increased. As the use of batteries is enlarged to applications for the storage of energy for portable telephones, camcorders, notebook computers, personal computers and electric vehicles, efforts on the research and development of batteries are increasingly embodied. In this view, the field of electrochemical devices receives the greatest attention, and among them, interests in the development of chargeable/dischargeable secondary batteries are focused. More recently, in the development of such batteries, active studies have been conducted to design a novel electrode and battery, which provide an improved capacity density and specific energy.

Among secondary batteries which are now in use, lithium secondary batteries developed in the early 1990s are in the spotlight due to the advantages of higher drive voltages and far greater energy densities than those of conventional batteries, such as Ni-MH, Ni—Cd and sulfuric acid-lead batteries. In general, a lithium ion battery comprises a lithium metal oxide as a cathode active material, a carbonaceous material or a lithium metal alloy as an anode active material, and a solution containing a lithium salt dissolved in an organic solvent as an electrolyte. Organic solvents that have been used widely in recent years include ethylene carbonate, propylene carbonate, dimethoxyethane, gamma-butyrolactone (GBL), N,N-dimethyl formamide, tetrahydrofuran or acetonitrile. However, the organic solvents have enough volatility to cause evaporation, and are also highly ignitable, and thus are problematic in terms of stability under overcharge, overdischarge, short circuit and high temperature conditions, when applied to a lithium ion secondary battery.

Recently, there has been an attempt to use an ionic liquid as an electrolyte in order to solve the above problems. U.S. Pat. No. 5,827,602 (V. R. Koch et al.) discloses an $AlCl_3$-EMICI (1-ethyl-3-methylimidazolium chloride) ionic liquid containing a strong Lewis acid useful as an electrolyte for a lithium ion battery. Since $AlCl_3$-EMICI has no vapor pressure, it is possible to solve the problems of evaporation and ignition of an electrolyte. However, when $AlCl_3$-EMICI is exposed to a small amount of water or oxygen, it emits harmful gas. Also, $AlCl_3$-EMICI has additional problems in that it has high reactivity with electrolyte additives and is easily decomposed particularly at a temperature above 150° C.

As another attempt, Japanese Patent Publication No. 2002-110225 discloses an imidazolium-based ionic liquid and an ammonium-based ionic liquid for use in a lithium ion secondary battery. However, the ionic liquids are problematic in that they are reduced at an anode under a voltage higher than the redox potential of a lithium ion, or imidazolium and ammonium cations may be intercalated into an anode along with lithium ions. Further, even if either an imidazolium-based ionic liquid or an ammonium-based ionic liquid is used alone as a liquid electrolyte for a lithium secondary battery, the ionic liquid is not suitable to be applied to a practical secondary battery due to a significant drop in capacity of a secondary battery during repeated charge/discharge cycles.

Therefore, many attempts have been made to modify an electrode active material or to develop a novel electrode active material so that the problems occurring in conventional organic electrolytes and ionic liquids can be solved. Also, various attempts have been made to develop a novel electrolyte comprising additives.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
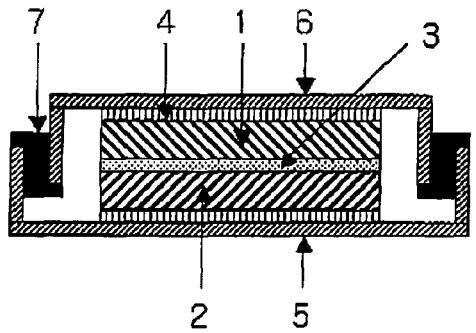
FIG. 1 is a schematic sectional view showing a coin type secondary battery.

Therefore, the present invention has been made in view of the above-mentioned problems. We have found that when a cost-efficient eutectic mixture having excellent thermal and chemical stability is used in an electrolyte for electrochemical devices, it is possible to solve the problems of evaporation and flammability of electrolytes caused when using a conventional organic solvent as electrolyte. We have also found that it is possible to solve the problems occurring in a conventional ionic liquid, including decomposition of an ionic liquid caused by its high reduction potential, interruption of lithium ion intercalation caused by the presence of two cations, complicated and cost-inefficient synthesis and purification procedure, or the like. As a result, it is possible to improve the safety of a battery and to improve the quality of a battery by virtue of excellent conductivity and a broad electrochemical window of the eutectic mixture.

However, we have recognized that when an electrolyte containing a eutectic mixture is used in combination with a conventional carbonaceous material-based anode, the electrolyte is decomposed due to electrochemical reactions generated at a potential beyond the chemical window of the eutectic mixture, resulting in degradation in the quality of a battery.

Therefore, it is an object of the present invention to provide a secondary battery, which uses a eutectic mixture-containing electrolyte in combination with an anode active material having a potential vs. lithium potential (Li/Li+) within an electrochemical window of the eutectic mixture, and thus shows improved safety and quality.

According to an aspect of the present invention, there is provided a secondary battery comprising a cathode, an anode, a separator and an electrolyte, wherein the electrolyte comprises a eutectic mixture formed of: (a) an amide group-containing compound, and (b) an ionizable lithium salt, and the anode comprises a metal or metal oxide having a potential vs. lithium potential (Li/Li+) within the electrochemical window of the eutectic mixture.

Hereinafter, the present invention will be explained in more detail.

The present invention is characterized by using a eutectic mixture-containing electrolyte in combination with an anode active material having a potential vs. lithium potential (Li/Li+) within the electrochemical window of the eutectic mixture.

As generally known in the art, like an ionic liquid (IL), a eutectic mixture has high electric conductivity, a broad electrochemical window, non-flammability, a broad range of temperatures where it exists as a liquid, high salvation capability and non-coordinate bonding capability, and thus shows physicochemical properties as an eco-friendly solvent that can substitute for existing harmful organic solvents. Moreover, since a eutectic mixture is prepared more easily as compared to an ionic liquid and has flame resistance, high ionic concentration and a broad electrochemical window (0.5~5.5V), it can be expected that a eutectic mixture has a broad spectrum of applications. However, when an electrolyte using such an eutectic mixture alone is used in combination with a carbonaceous material as an anode active material to form a secondary battery, decomposition of an electrolyte and degradation of the quality of the secondary battery occur due to electrochemical reactions of an anode generated at a potential (e.g. 0~1V) beyond the electrochemical window of the eutectic mixture.

In other words, when an electrochemical reaction occurs under a potential beyond the electrochemical window of an electrolyte at either of the cathode or the anode of a battery during charge/discharge cycles of the battery, electrolyte decomposition occurs. For example, when a carbonaceous material having a potential vs. lithium potential of 0~1V is used as an anode active material in combination with a eutectic mixture having an electrochemical window of 1V or more as an electrolyte, reduction occurs at the anode due to the potential beyond the electrochemical window, thereby causing decomposition of the eutectic mixture, resulting in a rapid drop in the initial capacity and lifespan of a battery.

In this regard, the inventors of the present invention have recognized that there is an interrelation between decomposition of a eutectic mixture during the initial charge and the problem of a drop in the initial capacity and lifespan of a battery. Thus, according to the present invention, it is possible to solve the problems of decomposition of an electrolyte and degradation of the quality of a battery, by using an anode active material having a potential vs. lithium potential within the electrochemical window of the eutectic mixture.

A eutectic mixture is an essential element for forming the electrolyte of a battery according to the present invention.

Generally, a eutectic mixture is referred to as a mixture containing two or more substances and having a decreased melting point. Particularly, such eutectic mixtures include mixed salts present in a liquid phase at room temperature. Herein, room temperature means a temperature of up to 100° C., or a temperature of up to 60° C. in some cases.

According to a preferred embodiment of the present invention, one of the constitutional elements forming the eutectic mixture is an amide group-containing compound having two different polar functional groups, i.e. a carbonyl group and an amine group, in its molecule. However, any compound having at least two polar functional groups (e.g. an acidic group and a basic group) in the molecule may be used with no particular limitation. The polar functional groups different from each other serve as complexing agents that weaken the bond between the cation and the anion of the ionizable salt, thereby forming a eutectic mixture, resulting in a drop in melting temperature. In addition to the above functional groups, compounds comprising polar functional groups that can weaken the bond between a cation and anion of an ionizable salt, and thus are capable of forming a eutectic mixture, are also included in the scope of the present invention.

The amide group-containing compound may be an amide group-containing compound having a linear structure, a cyclic structure or a combination thereof. Non-limiting examples of the amine group-containing compound include C1~C10 alkyl amide, alkenyl amide, aryl amide or allyl amide compounds. Also, primary, secondary or tertiary amide compounds may be used. It is more preferable to use a cyclic amide compound showing a broader electrochemical window because such cyclic amide compounds have a smaller number of hydrogen atoms and are stable under a high voltage so as to prevent decomposition thereof. Non-limiting examples of the amide compound that may be used in the present invention include acetamide, urea, methyl urea, caprolactam, valerlactam, trifluoroacetamide, methyl carbamate, formamide and mixtures thereof.

The other constitutional element forming the eutectic mixture according to the present invention includes any lithium-containing ionizable salts. Non-limiting examples of such salts include lithium nitrate, lithium acetate, lithium hydroxide, lithium sulfate, lithium alkoxide, lithium halides, lithium oxide, lithium carbonate, lithium oxalate, or the like. Particularly, $LiN(CN)_2$, $LiClO_4$, $Li(CF_3)_3PF_3$, $Li(CF_3)_4PF_2$, $Li(CF_3)_5PF$, $Li(CF_3)_6P$, $Li(CF_2CF_2SO_3)_2N$, $Li(CF_3SO_3)_2N$, $LiCF_3SO_3$, $LiCF_3CF_2(CF_3)_2CO$, $Li(CF_3SO_2)_2C$, $Li(CF_3SO_2)_3C$, $LiCF_3(CF_2)_7SO_3$, $LiCF_3CO_2$, $LiCH_3CO_2$, etc. are preferred.

The eutectic mixture according to the present invention may be represented by the following Formula 1, but is not limited thereto:

[Formula 1]

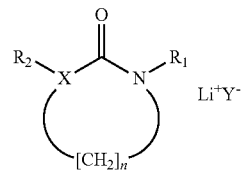

wherein $R_1$ is a hydrogen atom, a C1~C20 alkyl group, alkylamine group, alkenyl group, aryl group or allyl group;

$R_2$ is a hydrogen atom, a halogen atom, a C1~C20 alkyl group, alkenyl group, aryl group or allyl group;

X is selected from the group consisting of oxygen, carbon, nitrogen and sulfur, with the proviso that when X is oxygen or sulfur, n is 0 or $R_2$ is null;

Y represents an anion capable of forming a salt with lithium; and n is an integer of 0~10.

In the compound represented by the above Formula 1, there is no particular limitation on anion Y of the lithium salt as long as it is capable of forming a salt with lithium. Non-limiting examples of such anions include; $F^-$, $Cl^-$, $Br^-$, $I^-$, $NO_3^-$, $N(CN)_2^-$, $BF_4^-$, $ClO_4^-$, $RSO_3^-$, $RCOO^-$; $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $(CF_3SO_3^-)_2$, $(CF_2CF_2SO_3^-)_2$, $(CF_3SO_3)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2^-)_2N$, etc.

As described above, the constitutional elements of the eutectic mixture, i.e. the amide group-containing compound and the lithium salt (LiY) cause the formation of a coordination bond between the carbonyl group (C=O) present in the amide group-containing compound and the lithium cation ($Li^+$) of the lithium salt, as well as the formation of a hydrogen bond between the anion ($Y^-$) of the lithium salt and the amine group ($-NH_2$) present in the amide group-containing compound, as shown in the following Reaction Scheme 1. As a result, the amide group-containing compound and the lithium salt, which were originally present in a solid state, show a decreased melting point, while they form a eutectic mixture present in a liquid state at room temperature.

[Reaction Scheme 1]

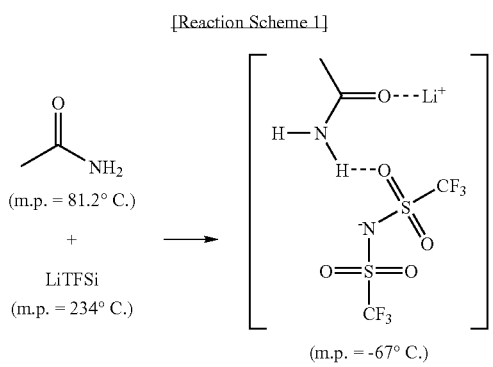

Although there is no particular limitation on the melting point of the eutectic mixture according to the present invention, it is preferable that the eutectic mixture is in a liquid state at a temperature of up to 100° C., more preferably at room temperature. Also, although there is no particular limitation on viscosity of the eutectic mixture according to the present invention, the eutectic mixture preferably has a viscosity of 100 cp or less.

The eutectic mixture may be prepared by a conventional process known to one skilled in the art. For example, a compound having an amide group is mixed with a lithium salt at room temperature and then the mixture is allowed to react by heating it at a suitable temperature of 70° C. or less, followed by purification. Herein, the molar ratio (%) of the amide-based compound to the lithium salt suitably ranges from 1:1 to 8:1, more preferably from 2:1 to 6:1.

The electrolyte comprising the aforementioned eutectic mixture provides the following advantages:

(1) The electrolyte comprising the aforementioned eutectic mixture shows a broader electrochemical window when compared to conventional organic solvents and ionic liquids due to the basic physical properties of the eutectic mixture, including physical stability of the eutectic mixture itself, so that an electrochemical device using the above electrolyte can have an extended range of drive voltage. In fact, conventional electrolytes using ionic liquids and organic solvents show an upper limit of electrochemical window of approximately 4~4.5V, while the eutectic mixture according to the present invention shows an upper limit of electrochemical window of 4.5~5.5V, which is significantly extended when compared to the conventional electrolytes based on ionic liquids and organic solvents. More particularly, the eutectic mixtures of caprolactam/LiTFSI and valerolactam/LiTFSI have an electrochemical window of 5.5V, and the eutectic mixture of $LiSO_3CF_3$/methyl urea shows an electrochemical window of 5.7V. Thus, the eutectic mixtures can be applied to a high drive voltage (see Table 1).

(2) Additionally, the eutectic mixture contained in the electrolyte according to the present invention has no vapor pressure contrary to conventional solvents, and thus shows no problem of evaporation and exhaustion of the electrolyte. Also, the eutectic mixture has flame resistance, thereby improving the safety of an electrochemical device. Moreover, the eutectic mixture itself is very stable, and thus can inhibit side reactions in the electrochemical device. Further, high conductivity of the eutectic mixture can contribute to improvement of the quality of a battery.

(3) Additionally, since the eutectic mixture contains a lithium salt, addition of a separate lithium salt can be avoided even in the case of a lithium secondary battery requiring intercalation/deintercalation of lithium ions into/from a cathode active material.

(4) Further, conventional ionic liquids used as an electrolyte for a lithium secondary battery according to the prior art have caused a problem of a drop in capacity of the secondary battery, particularly in the initial capacity and the capacity after the third cycle during repeated charge/discharge cycles. Such a drop in the initial capacity of a secondary battery and a drop in capacity during repeated charge/discharge cycles relate to a so-called SEI (solid electrolyte interface) film, which is a passivation layer formed on the surface of an anode at the initial charge. When using a carbonaceous material as an anode active material, an ionic liquid used as an electrolyte was reduced and decomposed at the anode under a higher voltage than the lithium potential due to the high reduction potential of the ionic liquid itself. Additionally, the ionic liquid contains at least two organic cations, such as imidazolium and ammonium cations, which are larger than lithium ions, and thus the organic cations with a high moving rate reach the anode more promptly than lithium ions so that the anode is surrounded with the cations. As a result, smooth movement and intercalation of lithium ions into the anode are inhibited, resulting in co-intercalation of lithium ions and cations into the anode.

On the contrary, according to the present invention, it is possible to prevent decomposition of an electrolyte, by using a eutectic mixture having a high electrochemical window in combination with an anode active material having a potential vs. lithium potential within the electrochemical window of the eutectic mixture. Additionally, because lithium ion ($Li^+$) is the only cation present in the eutectic mixture, it is possible to solve the problem of inhibition of lithium ion intercalation into an anode. Further, it is possible to improve the quality of a battery by virtue of the smooth movement of lithium ions.

<Electrolyte Comprising Eutectic Mixture>

The eutectic mixture according to the present invention may be applied to any electrolytes regardless of the forms of electrolytes. Preferably, the eutectic mixture may be applied to two types of electrolytes, i.e. liquid electrolytes and gel polymer electrolytes.

(1) According to an embodiment of the present invention, the electrolyte is a liquid type eutectic mixture-containing electrolyte, which may be obtained by using the eutectic mixture formed of the above amide group-containing compound and the lithium-containing ionizable salt alone. The electrolyte may further comprise electrolyte additives generally known to those skilled in the art.

②  According to another embodiment of the present invention, the electrolyte is a gel polymer type eutectic mixture-containing electrolyte. The gel polymer serves to support the eutectic mixture. Thus, in this case, it is possible to solve the problem of electrolyte leakage, and to form an electrochemical device in the form of a thin film or other films.

The gel polymer electrolyte may be prepared by using a method generally known to those skilled in the art. The method may be performed according to the following three types of embodiments. It is matter of course that the eutectic mixture may further comprise electrolyte additives as described above.

① According to a preferred embodiment of the method, polymerization of monomers is performed in the presence of the eutectic mixture to form a gel polymer electrolyte. The method of forming a gel polymer electrolyte via polymerization of monomers may be performed by in-situ polymerization inside an electrochemical device. Otherwise, a gel polymer electrolyte may be introduced into an electrochemical device, after the gel polymer electrolyte is formed.

The gel polymer electrolyte can be formed by polymerizing an electrolyte pre-gel containing: (i) a eutectic mixture comprising an amide group-containing compound and a lithium-containing ionizable salt; and (ii) monomers capable of forming a gel polymer via polymerization.

There is no limitation on the kind of monomer as long as it is capable of forming a gel polymer by polymerization, and particular examples of such monomers include vinyl monomers, etc. Vinyl monomers have advantages in that they can provide transparent polymerization products when mixed with a eutectic mixture and are amenable to simple polymerization conditions.

Non-limiting examples of the vinyl monomer that may be used according to the present invention include acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene, para-cyanostyrene, etc. Preferably, the monomer capable of forming a gel polymer by polymerization provides low volumetric shrinkage upon polymerization and permits in-situ polymerization inside of an electrochemical device.

The polymerization of the monomers is generally performed under heat or UV irradiation, and thus the electrolyte pre-gel may further comprise a polymerization initiator or a photoinitiator.

Initiators are decomposed by heat or UV rays to form radicals, and then react with a monomer through free radical polymerization to form a gel polymer electrolyte. It is also possible to carry out polymerization of monomers without using any initiator. Generally, free radical polymerization includes an initiation step in which transient molecules or active points having strong reactivity are formed; a propagation step in which a monomer is added to the end of an active chain to form another active point at the end of the chain; a chain transfer step in which active points are transferred to other molecules; and a termination step in which the center of an active chain is broken.

Thermal initiators that may be used in the polymerization include organic peroxides or hydroperoxides such as benzoyl peroxide, acetyl peroxide, dilauryl peroxide, di-tert-butyl peroxide, cumyl hydroperoxide, hydrogen peroxide, etc., and azo compounds such as 2,2-azobis(2-cyanobutane), 2,2-azobis(methylbutyronitrile), AIBN(azobis(iso-butyronitrile), AMVN (azobisdimethyl-valeronitrile), organometallic compounds such as alkylated silver compounds, etc. Additionally, non-limiting examples of the photoinitiator that permits formation of radicals by the light such as UV rays include chloroacetophenone, diethoxy acetophenone (DEAP), 1-phenyl-2-hydroxy-2-methyl propaneone (HMPP), 1-hydroxycyclohexyl phenyl ketone, α-aminoacetophenone, benzoin ether, benzyl dimethyl ketal, benzophenone, thioxanthone, 2-ethylanthraquinone (2-ETAQ), etc.

Additionally, the mixing ratio in the electrolyte precursor solution according to the present invention on the weight basis, i.e., the weight ratio of (eutectic mixture) x:(monomer capable of forming a gel polymer by polymerization) y:(polymerization initiator) z, is 0.5~0.95:0.05~0.5:0.00~0.05, with the proviso that x+y+z=1. More preferably, x is 0.7~0.95, y is 0.05~0.3 and z is 0.00~0.01.

In addition to the above-described materials, the precursor solution of gel polymer electrolyte according to the present invention optionally further comprises other additives known to one skilled in the art.

As described above, the in-situ polymerization is initiated by irradiation of heat or UV rays so as to form a gel polymer electrolyte. Herein, the polymerization degree of the gel polymer depends on reaction conditions, i.e. polymerization time and temperature in the case of heat polymerization, or light irradiation dose in the case of UV polymerization. Therefore, it is possible to control the polymerization degree of a gel polymer as desired by controlling the reaction conditions including polymerization time, polymerization temperature or light irradiation dose. Additionally, polymerization time depends on the kind of initiator used for the polymerization and polymerization temperature. It is preferable that polymerization is performed for a period of time during which leakage of the gel polymer electrolyte cannot occur and the electrolyte cannot be over-polymerized to such a degree that it causes volumetric shrinkage. For example, polymerization is generally performed for about 20~60 minutes at a temperature of about 40~80° C.

② According to another preferred embodiment of the present invention, the eutectic mixture is injected to a preformed polymer or gel polymer so that the polymer or gel polymer is impregnated with the eutectic mixture.

Non-limiting examples of the polymer that may be used in the present invention include polymethyl methacrylate, polyvinylidene difluoride, polyvinyl chloride, polyethylene oxide, polyhydroxyethyl methacrylate, etc. Any gel polymers known to one skilled in the art may also be used. In this case, it is possible to simplify processing steps compared to the above in-situ polymerization method.

③ According to still another preferred embodiment of the present invention, a polymer and the eutectic mixture are dissolved in a solvent and then the solvent is removed to form a gel polymer electrolyte. Herein, the eutectic mixture is included in the polymer matrix.

Although there is no particular limitation on selecting the solvent, and an organic solvent currently used in a battery may be used. Non-limiting examples of the solvent include toluene, acetone, acetonitrile, THF, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL) or a mixture thereof. Such organic solvents may deteriorate the safety of a secondary battery due to their inflammability. Thus, it is preferable to use such organic solvents in a small amount. Additionally, phosphates may be used as a flame retardant currently used for a lithium secondary battery, and non-limiting examples thereof include trimethyl phosphate, triethyl phosphate, ethyl dimethyl phosphate, tripropyl phosphate, tributyl phosphate, tributyl phosphate or a mixture thereof.

Additionally, there is no particular limitation on the method for removing the solvent and any conventional heating methods may be used. The third method has a disadvantage in that there is a need of a post-treatment step for removing a solvent in order to form the gel polymer electrolyte. However, the gel polymer electrolyte may have improved lithium ion conductivity by allowing the gel polymer electrolyte to have a part of solvent that are not completely removed.

<Secondary Battery Using Electrolyte Comprising Eutectic Mixture>

The secondary battery according to the present invention comprises an anode, a cathode, an electrolyte and a separator, as shown in FIG. 1.

Herein, the secondary battery includes all types of secondary batteries in which electrochemical reactions are performed continuously through repeated charge/discharge cycles. Preferably, the secondary batteries are lithium secondary batteries and non-limiting examples of the lithium secondary battery include lithium metal secondary batteries, lithium ion secondary batteries, lithium polymer secondary batteries or lithium ion polymer batteries.

The secondary battery may be manufactured by using a method generally known to those skilled in the art. According to one embodiment of the method, both electrodes (a cathode and an anode) are stacked with a separator interposed between both electrodes to form an electrode assembly, and then the eutectic mixture-containing electrolyte is injected thereto.

The cathode and the anode may be obtained by a conventional method known to those skilled in the art. Particularly, electrode slurry containing each electrode active material, i.e. a cathode active material or an anode active material, is provided, the electrode slurry is applied onto each current collector, and the solvent or dispersant is removed, for example, by way of drying, so as to allow the active material to be bound to the current collector, and to permit the active material particles to be bound among themselves.

There is no particular limitation on the anode active material, as long as it has a potential vs. lithium potential (Li/Li$^+$) within the electrochemical window of the eutectic mixture used as an electrolyte and it is capable of lithium intercalation/deintercalation. For example, metals or metal oxides having a potential vs. lithium potential, which is higher than the lowest value of the electrochemical window of the eutectic mixture, may be used. Preferably, metals or metal oxides having a potential vs. lithium potential (Li/Li$^+$) of at least 1V.

Non-limiting examples of the anode active material that may be used in the present invention include $WO_3$, $MoO_3$, $LiCr_3O_8$, $LiV_3O_8$, $TiS_2$, oxides represented by the formula of $Li_xTi_{5/3-y}L_yO_4$, such as $Li_{4/3}Ti_{5/3}O_5$ having a spinel type structure, a mixture thereof, or the like.

In the above oxide ($Li_xTi_{5/3-y}L_yO_4$), L represents at least one element selected from the group consisting of Group 2 to Group 16 elements, except Ti and O, and non-limiting examples of substituent element L include Be, B, C, Mg, Al, Si, P, Ca, Sc, V, Cr, Mn, Fe, Co, Ni, Cu, Zn, Ga, Ge, As, Se, S, Y, Zr, Nb, Mo, Pd, Ag, Cd, In, Sn, Sb, Te, Ba, La, Ta, W, Hg, Au, Pb or a combination thereof. Additionally, x and y are preferably $4/3 \leq x \leq 7/3$ and $0 \leq y \leq 5/3$, but are not limited thereto.

The cathode active material that may be used in the present invention includes conventional cathode active materials currently used in the art. For example, metals or metal oxides with a potential vs. lithium (Li/Li$^+$) of 4V or more may be used with no particular limitation. Non-limiting examples of the cathode active material include $LiCoO_2$, $LiNiO_2$, $LiMnO_2$, $LiMn_2O_4$, $LiCrO_2$, $LiFePO_4$, $LiFeO_2$ $LiCoVO_4$, $LiCr_xMn_{2-x}O_4$, $LiNiVO_4$, $LiNi_xMn_{2-x}O_4$, $Li_{2-x}CoMn_3O_8$, oxides represented by the formula of $Li_x[Ni_{2-y}M_yO_4]$ having a spinel type structure, or the like.

In the above oxides ($Li_x[Ni_{2-y}M_yO_4]$), M represents at least one transition metal generally known to those skilled in the art, other than nickel, and non-limiting examples thereof include Mn, Co, Zn, Fe, V or a combination thereof. Additionally, x and y are preferably $0 \leq x \leq 1.1$ and $0.75 \leq y \leq 1.80$, but are not limited thereto.

The separator that may be used in the present invention includes a porous separator that serves to interrupt an internal short circuit between both electrodes and is impregnated with an electrolyte. Non-limiting examples of the separator include a polypropylene-based, polyethylene-based or polyolefin-based separator, or a composite porous separator comprising inorganic materials incorporated into the porous separator.

In addition to the above constitutional elements, the secondary battery may further comprise conductive elastic polymers for filling the remaining space of the secondary battery.

There is no particular limitation on the outer shape of the lithium secondary battery obtained in the above-described manner. The lithium secondary battery may be a cylindrical battery using a can, a prismatic battery, or a pouch-type battery.

BEST MODE FOR CARRYING OUT THE INVENTION

Reference will now be made in detail to the preferred embodiments of the present invention. It is to be understood that the following examples are illustrative only and the present invention is not limited thereto.

Examples 1-9

Example 1

$LiNi_{0.5}Mn_{1.5}O_4$ as a cathode active material, artificial graphite as a conductive agent and polyvinylidene fluoride as a binder were mixed in a weight ratio of 94:3:3, and N-methylpyrrolidone was added to the resultant mixture to provide slurry. The slurry was applied onto aluminum foil, and then dried at 130° C. for 2 hours to provide a cathode.

$Li_{3/4}Ti_{5/3}O_4$ having a potential vs. lithium potential of 1.5V as an anode active material, artificial graphite and a binder were mixed in a weight ratio of 94:3:3, and N-methylpyrrolidone was added to the resultant mixture to provide slurry. The slurry was applied onto copper foil, and then dried at 130° C. for 2 hours to provide an anode.

Then, 5 g of purified acetamide and 6 g of $Li(CF_3SO_2)_2N$ were introduced into a round-bottom flask and stirred gradually at room temperature under a nitrogen atmosphere for 12 hours to provide 11 g of a eutectic mixture. Next, the eutectic mixture obtained as described above, 2-hydroxyethyl methacrylate monomer, and azobisdimethyl valeronitrile as a heat polymerization initiator were mixed in a weight ratio of 8:2:0.01. The resultant mixture was allowed to polymerize at 55° C. for 1 hour to form a gel polymer electrolyte.

The cathode and the anode obtained as described above were provided, each in a size of 1 cm$^2$, and a separator was inserted between both electrodes, and the eutectic mixture electrolyte obtained as described above was injected thereto to provide a secondary battery as shown in FIG. 1.

Examples 2~9

Lithium secondary batteries were provided in the same manner as described in Example 1, except that the amide group-containing compounds and the lithium salts as shown in the following Table 1 were used instead of purified acetamide and $Li(CF_3SO_2)_2N$.

Comparative Example 1

A lithium secondary battery was provided by using $Li_{3/4}Ti_{5/3}O_4$ having a potential vs. lithium potential of 1.5V as an anode active material in the same manner as described in Examples 1, except that an ionic liquid, $EMI-BF_4$ was used as an electrolyte instead of the eutectic mixture.

Comparative Example 2

A lithium secondary battery was provided in the same manner as described in Example 1, except that an anode obtained by using a carbonaceous material (graphite) having a potential vs. lithium potential less than 0.5V was used. The anode used in this example was provided by mixing graphite as an anode active material, artificial graphite and a binder in a weight ratio of 94:3:3, adding N-methylpyrolidone thereto to form slurry, and applying the resultant slurry onto copper foil, followed by drying at 130° C. for 2 hours.

Experimental Example 1

Evaluation of Physical Properties for Eutectic Mixtures

The following test was performed to evaluate physical properties of the eutectic mixture comprising an amide group-containing compound and a lithium salt according to the present invention.

Each eutectic mixture was measured for its melting point by using DSC (differential scanning calorimeter). Also, the viscosity of each eutectic mixture was measured by using a RS150 viscosimeter at 25° C. Further, each eutectic mixture was measured for its electrochemical window by using glassy carbon as a working electrode, lithium as a reference electrode, and lithium or platinum as a counter electrode. The results are shown in the following Table 1.

Experimental Example 2

Analysis for Characteristics of Secondary Battery

The lithium secondary battery comprising a eutectic mixture as an electrolyte was analyzed for its characteristics according to the following test.

The lithium secondary battery using an anode having a potential vs. lithium potential of 1V or higher in combination with a eutectic mixture electrolyte was used as a sample. As controls, the lithium secondary battery using an ionic liquid electrolyte ($EMI-BF_4$) in combination with the anode having a potential vs. lithium potential of 1V or higher according to Comparative Example 1, and the lithium secondary battery using a conventional carbonaceous material as an anode active material in combination with a eutectic mixture electrolyte were used.

Figure 2:
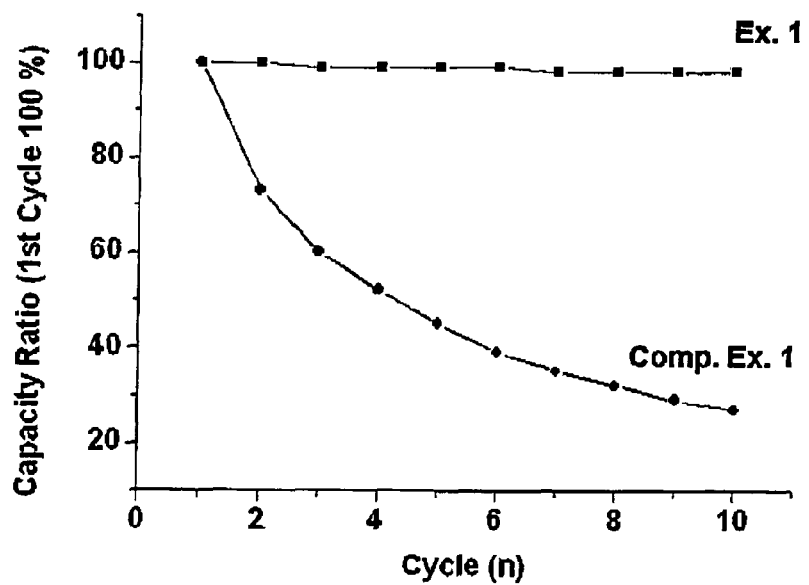
FIG. 2 is a graph showing variations in capacity of the lithium secondary battery using an anode comprising a metal oxide with a potential vs. lithium potential ($Li/Li^+$) of 1V or more as an anode active material in combination with a eutectic mixture-containing electrolyte according to Example 1, and the lithium secondary battery comprising an ionic liquid as an electrolyte according to Comparative Example 1.

After the test, the secondary battery according to Example 1 showed a discharge capacity of about 99% and a charge/discharge efficiency of about 99% (see FIG. 2). Since the anode and the cathode have a drive voltage of about 1.5V and about 4.5V, respectively, vs. lithium potential, and the eutectic mixture has an electrochemical window of 0.5V~5.5V, the secondary battery comprising the above elements shows a drive voltage of about 3V, provides excellent energy density, and is stable against overcharge, overdischarge, a short circuit and thermal impact.

Figure 3:
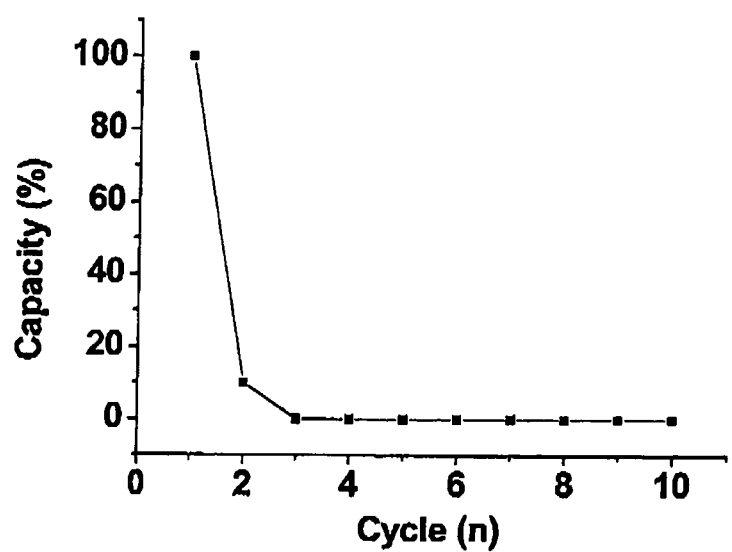
FIG. 3 is a graph showing variations in capacity of the lithium secondary battery using a conventional anode comprising a carbonaceous material in combination with a eutectic mixture-containing electrolyte according to Comparative Example 2.

On the other hand, the secondary battery using the ionic liquid ($EMI-BF_4$) as an electrolyte showed a discharge capacity of about 80%, a charge/discharge efficiency of 70% or less, and an average discharge voltage of 3V (see FIG. 2). Additionally, the battery using an anode comprising a conventional carbonaceous material according to Comparative Example 2 showed a rapid drop in capacity from the second cycle (see FIG. 3). This demonstrates that the carbonaceous material used as an anode active material causes electrochemical reactions at a potential beyond the electrochemical window of the eutectic mixture used as an electrolyte, resulting in degradation of the quality of the battery.

Therefore, it can be seen from the above results that the lithium secondary battery using a eutectic mixture in combination with an anode having a potential vs. lithium potential ($Li/Li^+$) within the electrochemical window of the eutectic mixture shows excellent quality as well as safety.

INDUSTRIAL APPLICABILITY

As can be seen from the foregoing, the secondary battery using a eutectic mixture as an electrolyte in combination with an anode having a potential vs. lithium potential ($Li/Li^+$) within the electrochemical window of the eutectic mixture,

TABLE 1

| Ex. | Salt | Amide | Molar ratio | $T_m$ (° C.) | $T_d$ (° C.) | μ (cP) | k (mS/cm) | Electrochemical Window (V) |
|---|---|---|---|---|---|---|---|---|
| 1 | $Li(CF_3SO_2)_2N$ | Acetamide | 1:4 | −67.0 | 100 | 100 | 1.07 | 0.7~4.4 |
| 2 | $Li(CF_3SO_2)_2N$ | Urea | 1:3 | −37.7 | 180 | 1190 | 0.23 | 0.8~3.8 |
| 3 | $Li(CF_3SO_2)_2N$ | Caprolactam | 1:3 | −38.3 | 120 | 3100 | 0.03 | 0.5~5.5 |
| 4 | $Li(CF_3SO_2)_2N$ | Methylurea | 1:3 | −8.2 | 150 | 677 | 0.12 | 0.5~5.3 |
| 5 | $Li(CF_3SO_2)_2N$ | Valerolactam | 1:3 | −44.8 | 130 | 910 | 0.17 | 0.5~5.5 |
| 6 | $LiClO_4$ | Methylurea | 1:3 | −9.2 | 150 | 990 | 0.22 | 1.3~5.3 |
| 7 | $LiSO_3CF_3$ | Acetamide | 1:4 | −50.3 | 100 | 30.4 | 3.47 | 0.8~5.5 |
| 8 | $LiSO_3CF_3$ | Methylurea | 1:3 | −34.4 | 150 | 85.8 | 2.50 | 0.7~5.7 |
| 9 | $LiSO_3CF_3$ | Valerolactam | 1:3 | 48.0 | 140 | 285 | 0.46 | 0.8~5.2 | solves the problems occurring in a conventional battery using a eutectic mixture as an electrolyte, such problems including decomposition of an electrolyte and degradation of the quality of a battery. Also, due to the thermal and chemical stability, high conductivity and a broad electrochemical window of a eutectic mixture, it is possible to improve the quality as well as safety of a battery.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A secondary battery comprising:
   a cathode,
   an anode comprising a metal or metal oxide that has a potential vs. lithium potential (Li/Li$^+$) of 1V or higher,
   a separator, and
   an electrolyte,
   wherein the electrolyte is a gel polymer type electrolyte formed by polymerization of an electrolyte pre-gel comprising: (i) a eutectic mixture; and (ii) monomers capable of forming a gel polymer via polymerization,
   wherein the eutectic mixture is formed of: (a) an amide group-containing compound, and (b) an ionizable lithium salt, and the molar ratio (%) of the amide group-containing compound to the ionizable lithium salt ranges from 1:1 to 8:1, and the amide group-containing compound is bonded to the ionizable lithium salt,
   wherein the amide group-containing compound is selected from the group consisting of a compound represented by Formula A, acetamide, urea, methyl urea, trifluoroacetamide, methyl carbamate and formamide,
   wherein the amide group-containing compound forms the eutectic mixture with the ionizable lithium salt and is present in the electrolyte, and
   wherein the formula A is

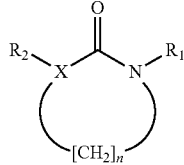

wherein $R_1$ is a hydrogen atom, a C1~C20 alkyl group, alkylamine group, aryl group or allyl group; $R_2$ is a hydrogen atom, a halogen atom, a C1~C20 alkyl group, aryl group or allyl group; X is selected from the group consisting of oxygen, CH, nitrogen and sulfur, with the proviso that when X is oxygen or sulfur, $R_2$ is null; and n is an integer of 0~10.

2. The secondary battery according to claim 1, wherein the lithium salt has at least one anion selected from the group consisting of F$^-$, Cl$^-$, Br$^-$, I$^-$, NO$_3^-$, N(CN)$_2^-$, BF$_4^-$, ClO$_4^-$, RSO$_3^-$, RCOO$^-$; PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, (CF$_3$SO$_3^-$)$_2$, (CF$_2$CF$_2$SO$_3^-$)$_2$, (CF$_3$SO$_3$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN and (CF$_3$CF$_2$SO$_2^-$)$_2$N.

3. The secondary battery according to claim 1, wherein the monomer is a vinyl monomer.

4. The secondary battery according to claim 3, wherein the vinyl monomer is at least one monomer selected from the group consisting of acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene and para-cyanostyrene.

5. The secondary battery according to claim 1, wherein the electrolyte pre-gel further comprises a polymerization initiator or a photoinitiator.

6. The secondary battery according to claim 5, wherein the electrolyte pre-gel comprises the eutectic mixture (x), the monomers capable of forming a gel polymer via polymerization (y) and the polymerization initiator (z) in a weight ratio of x:y:z, wherein x is 0.5~0.95, y is 0.0~50.5 and z is 0.00~0.05, with the proviso that x+y+z=1.

7. The secondary battery according to claim 1, wherein the gel polymer type electrolyte is obtained by in-situ polymerization inside the battery.

8. The secondary battery according to claim 1, wherein the metal or metal oxide having a potential vs. lithium potential of 1V or higher is at least one selected from the group consisting of WO$_3$, MoO$_3$, LiCr$_3$O$_8$, LiV$_3$O$_8$, TiS$_2$, and oxides represented by the formula of Li$_x$Ti$_{5/3-y}$L$_y$O$_4$ having a spinel type structure (wherein L represents at least one element selected from the group consisting of Group 2 to Group 16 elements, except Ti and O, 4/3≤x≤7/3 and 0≤y≤5/3).

9. The secondary battery according to claim 1, which is a lithium secondary battery.

* * * * *